United States Patent [19]
Slaney et al.

[11] Patent Number: 5,113,474
[45] Date of Patent: May 12, 1992

[54] METHOD AND APPARATUS FOR MECHANICAL CONNECTOR ASSEMBLY

[75] Inventors: Paul Slaney, Groton, Mass.; Soren Grinderslev, Shelton, Conn.

[73] Assignee: Optical Fiber Technologies, Inc., Westford, Mass.

[21] Appl. No.: 657,676

[22] Filed: Feb. 19, 1991

Related U.S. Application Data

[63] Continuation-in-part of Ser. No. 492,933, Mar. 13, 1990, and a continuation-in-part of Ser. No. 3,964, Jul. 11, 1990, and a continuation-in-part of Ser. No. 467,915, Jan. 22, 1990, abandoned, which is a continuation-in-part of Ser. No. 378,930, Jul. 12, 1989.

[51] Int. Cl.$^5$ .............................................. G02B 6/36
[52] U.S. Cl. ..................................... 385/136; 385/82; 385/87
[58] Field of Search ................ 350/96.20, 96.21, 96.22, 350/320; 269/86, 89

[56] References Cited

U.S. PATENT DOCUMENTS

| | | | |
|---|---|---|---|
| 4,834,488 | 5/1989 | Lee | 350/96.20 |
| 4,840,450 | 6/1989 | Jones et al. | 350/96.20 |
| 4,946,247 | 8/1990 | Muska et al. | 350/96.20 |
| 4,958,900 | 9/1990 | Ortiz, Jr. | 350/96.20 |

Primary Examiner—John D. Lee
Assistant Examiner—Phan T. Heartney
Attorney, Agent, or Firm—Lahive & Cockfield

[57] ABSTRACT

Apparatus and method for the assembly of an optical fiber termination that does not require adhesive applies a selected force characteristic over a selected displacement. The apparatus includes a holder element, a drive element, and a positioning element that directs the relative motion of the holder and drive elements. In operation, the holder element receives a partially assembled optical fiber termination including inner and outer elements and a compressive system. The drive element, guided by the positioning element, provides the force which presses the elements of the termination telescopically together. The telescoping of the two termination elements compresses the compressive system into mechanical engagement with the optical fiber. The pressing force has a limited maximal value to prevent undue stress or damage to the optical fiber.

14 Claims, 12 Drawing Sheets

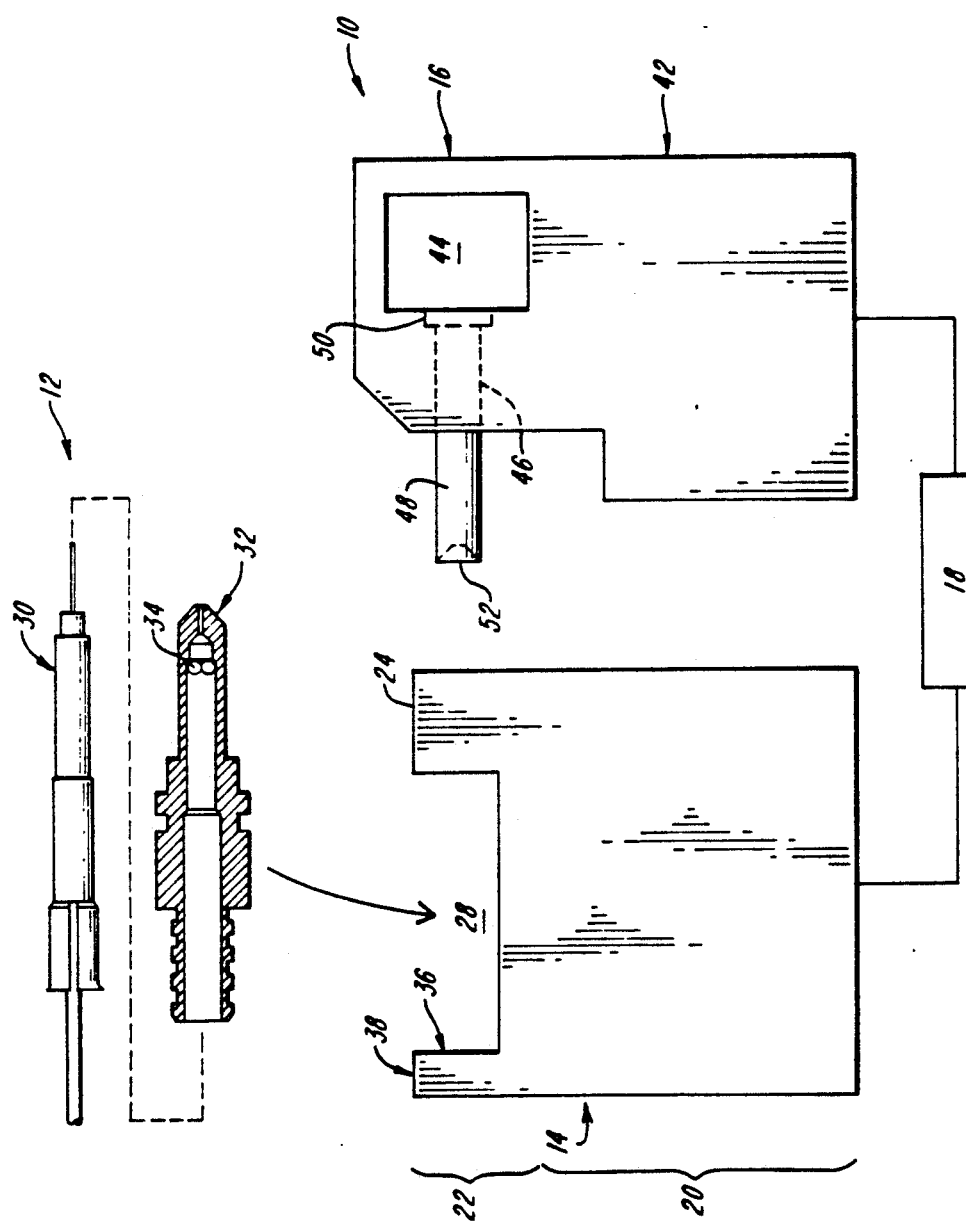

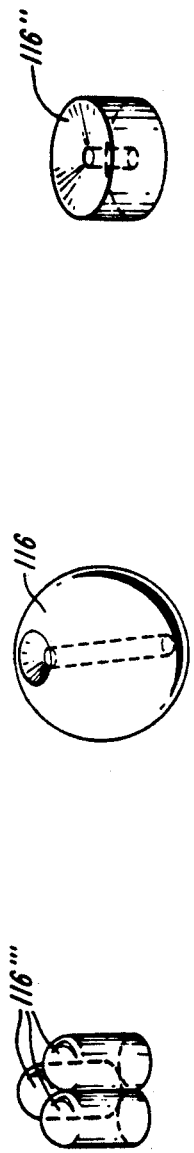
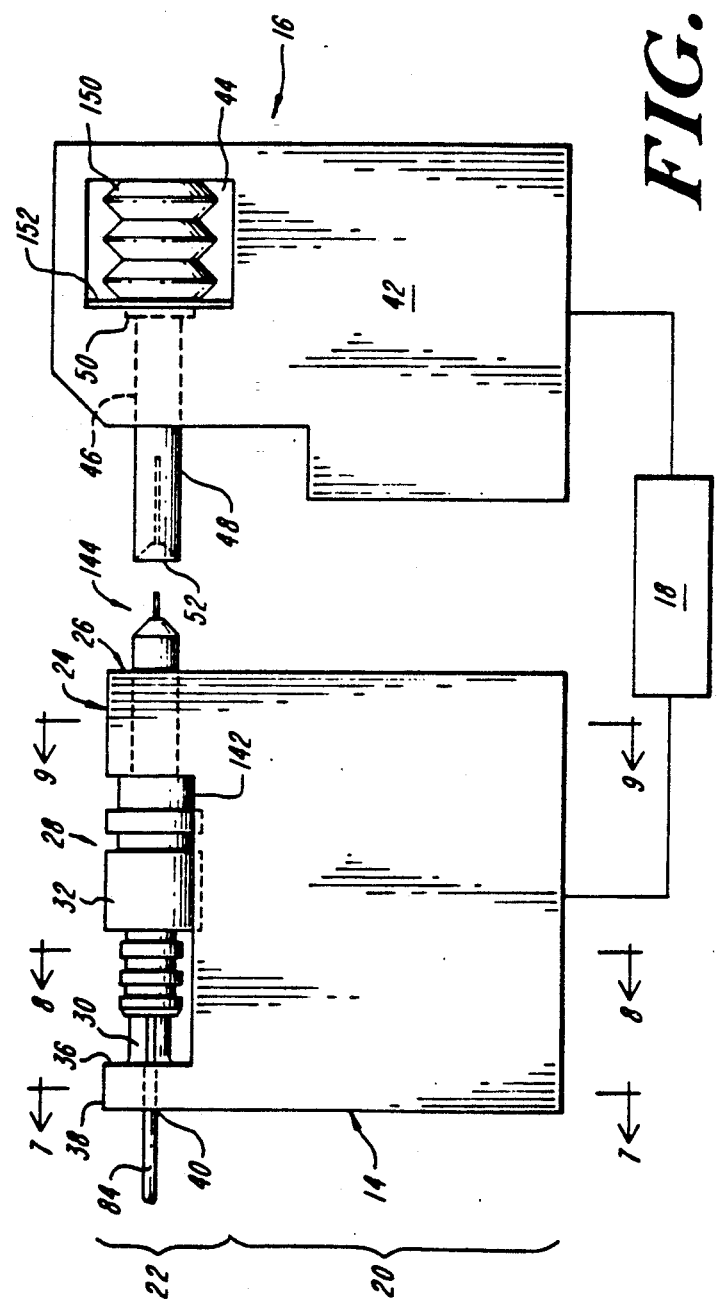

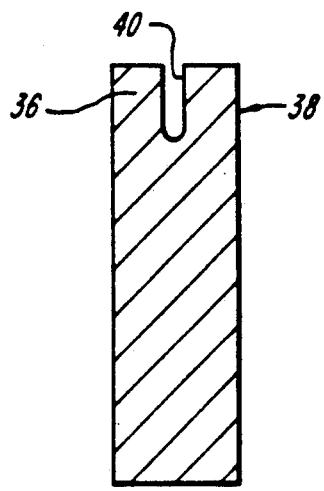
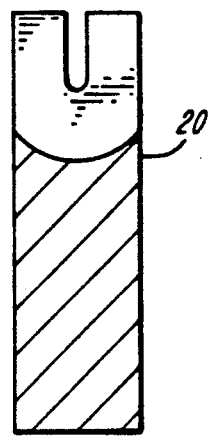
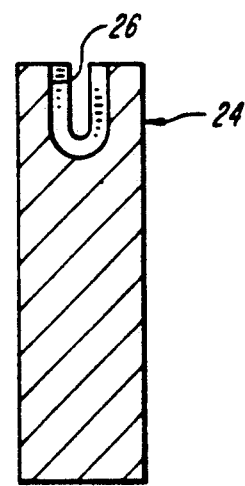
FIG. 7   FIG. 8   FIG. 9
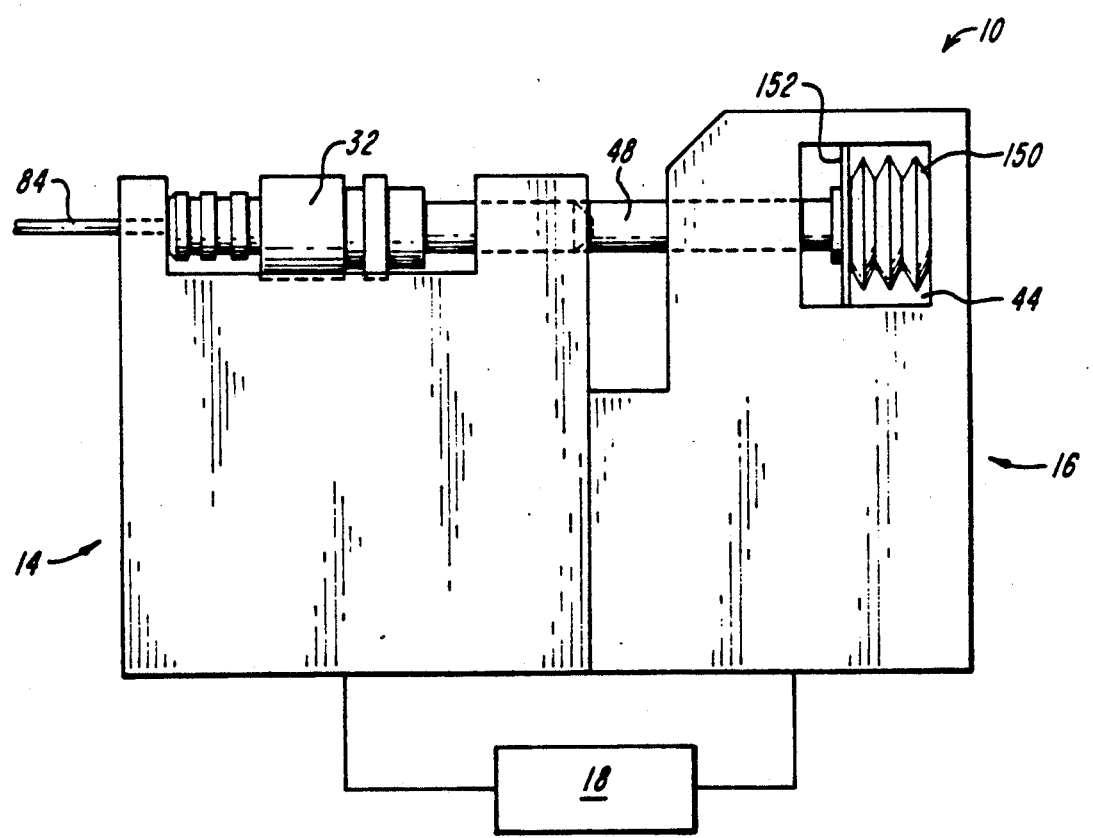
FIG. 10

10

METHOD AND APPARATUS FOR MECHANICAL CONNECTOR ASSEMBLY

REFERENCE TO RELATED APPLICATIONS

This application is a continuation-in-part of commonly-owned co-pending U.S. patent application Ser. No. 492,933, filed Mar. 13, 1990 for METHOD AND APPARATUS FOR CONNECTOR ASSEMBLY.

This application is also a continuation-in-part of commonly-owned co-pending PCT patent application Ser. No. PCT/US90/03964, filed Jul. 11, 1990 for METHOD AND APPARATUS FOR TERMINATING A FIBER-OPTIC CABLE WITHOUT ADHESIVE.

This application is also a continuation-in-part of commonly-owned co-pending U.S. patent application Ser. No. 07/467,915 now abandoned, filed Jan. 22, 1990 for METHOD AND APPARATUS FOR TERMINATING A FIBER-OPTIC CABLE WITHOUT ADHESIVE, which is a continuation-in-part of commonly-owned co-pending U.S. patent application Ser. No. 07/378,930 filed Jul. 12, 1989, for METHOD AND APPARATUS FOR TERMINATING A FIBER-OPTIC CABLE WITHOUT ADHESIVE.

The teachings of the above-cited patent applications are incorporated herein by reference.

BACKGROUND OF THE INVENTION

This invention relates to an apparatus and method for assembling telescopically interfitting workpieces. It relates in particular to an apparatus and method for assembling signal cable terminations that do not require adhesive.

The need for apparatus capable of producing nondestructive forces for the assembly of terminations is acute in the field of fiber optic communication cables. In particular, the desired apparatus is to be capable of assembling terminations for connecting segments of light-conductive cable with minimal detriment to the fiber and to its light transmission. Further, the apparatus is to satisfy the exceedingly demanding requirements of fiber alignment and spacing within the termination.

The cables used for fiber optic communications typically include at least one light transmitting, glass optical fiber having a core clad in an optically insulating material. The cladding protects the glass core, and prevents dispersion of light out from the optical core. The optical fiber usually has a protective external buffer, typically of a plastic material, which may or may not be removed to terminate the cable. The minute, micron-size diameter of the optical fibers renders them especially sensitive to the forces applied during the assembly of cable terminations.

Numerous systems have been developed to deform or compress fiber termination assemblies to selected dimensions. Prior systems, however, may subject the termination and optical fiber to excessive compression or deformation causing breakage or damage to the fiber and termination and, thus, reduced light transmission. Insufficient force, on the other hand, may result in incomplete assembly of the termination leading to undesirable movement of the optical fiber therewithin. These problems are typically cured by manufacturing both the termination and assembly tool to close tolerances. Close tolerance manufacture, however, undesirably raises the costs of both the termination and the tool.

It is accordingly an object of this invention to provide an improved method and apparatus for assembling a fiber optic cable termination by application of a selected force.

It is another object of the invention to provide a method and apparatus for assembling a fiber optic cable termination with minimal risk of subjecting the termination or cable to damaging or destructive forces.

It is also an object of the invention to provide a method and apparatus for assembling a fiber optic cable termination that is economical to manufacture, easy to use, and that provides a reliable, constant force characteristic.

Other objects of the invention will in part be obvious and will in part appear hereinafter.

SUMMARY OF THE INVENTION

The invention attains the foregoing objectives with an apparatus that includes a holder element, a drive element, and an element for maintaining the holder and the drive elements in selected disposition. The invention provides an apparatus and method for interfittingly assembling a first and a second workpiece by displacing them relative to each other along a path.

The holder element typically includes a jaw element for removably and replaceably holding a first workpiece in a selected alignment and position along a generally lineal path. The drive element is dimensioned to removably and replaceably engage a second workpiece that is partially assembled with the first workpiece held in the jaw element of the holder element. The drive element displaces the second workpiece relative to the first workpiece to interfittingly assemble the termination. Typically, a guide element maintains the holder and drive elements in selected disposition and directs them along the desired path. Upon complete displacement, i.e., closure, of the holder and drive elements, the first workpiece is fully assembled with the second workpiece.

More particularly, the holder element includes a jaw element which removably and replaceably receives the first workpiece. Preferably, the jaw element includes a cradle portion into which the first workpiece can be positioned. This cradle portion also receives the second workpiece which is partially assembled with the first workpiece. A forward portion of the jaw element generally includes a guide slot for receiving the forward end of the second workpiece. The jaw element can also include a rear seating face arranged to removably and replaceably receive the first workpiece. A slot in the rear seating face permits the exit of the signal conductor, e.g., optical fiber, upon which the termination is being affixed.

The drive element, which is configured to removably and replaceably engage the second workpiece, includes a resiliently acting element arranged to provide a force of selected characteristic. The force characteristic provided by the drive element displaces the second workpiece along a selected path, preferably lineal, relative to the first workpiece. The force characteristic provided by the drive element, in one embodiment of the invention, is preferably constant and substantially equal to, if not slightly greater than, the resistance forces that may be produced as a result of the displacement of the second workpiece relative to the first workpiece. It is preferred that the force characteristic of the drive element in this embodiment be constant over a selected displacement. The drive element can include a compression spring. In one embodiment of the invention, the drive element further includes a plunger element having a jaw element which removably and replaceably engages the second workpiece. In another embodiment of the invention, the drive element includes both a plunger element which contacts the compression spring and an intermediate plunger element structured with a jaw element which removably and replaceably engages the second workpiece.

The element for maintaining the holder element and the drive element in selected disposition preferably is a guide element. Preferably, the guide element directs the holder and drive elements such they move along a generally lineal path. In one embodiment of the invention, the guide element includes a pair of oppositely disposed, parallel guide rails. In this embodiment, either the holder or drive element are held in a static position and the other element slides on the rails. In an alternative embodiment of the invention, the holder and drive elements may be pivoted relative to each other guided along a common axis.

According to the method in the foregoing practice of the invention, a first workpiece is removably and replaceably held by a jaw element with selected alignment and position along a path. A second workpiece, partially assembled with the first workpiece, is removably and replaceably engaged by a drive element. The second workpiece is then displaced relative to the first workpiece with a selected force characteristic. In one preferred embodiment this force is substantially constant over a selected displacement.

Preferably, the first and second workpieces define a continuous passage in which is seated a fiber optic cable. The fiber optic cable can be buffered or unbuffered. A portion of the fiber extending through the passage is substantially encircled by a compressive system located between the first and second workpieces. The compressive system can be deformed in a radially inward direction. The actuation of the drive element relative to the holder element results in the further telescopic interfitting and assembly of the first and second workpieces. This telescopic interfitting causes the compressive system to compress into supporting and retaining engagement with the optical fiber.

The exposed, connecting end of an optical fiber that is secured in an assembled termination using the apparatus and method of the invention can be polished in a manner conventional in the art.

According to further features of the invention, the apparatus and method develop a force characteristic for assembling a fiber optic termination and which, upon attaining a selected maximal value, releases to a lesser value. The selected maximal force value is sufficient for securing a mechanical fiber-engaging compressive system in the termination, and the release characteristic prevents damage to the optical fiber.

The foregoing features of the invention, and others described below, provide a highly reliable apparatus and method for assembling fiber optic cable terminations using a force having, in one embodiment, a constant characteristic. In another embodiment, the force has a selected maximal value. The invention can be practiced economically and hence cost competitively with existing practices and structures.

Although the invention thus provides a tool for affixing a termination to a fiber optic cable that is durable, precise and reliable, features of the apparatus and of the method of the invention may be used to advantage together with other fibers and wires, and the invention has corresponding scope.

DESCRIPTION OF THE DRAWINGS

For a fuller understanding of the nature and objects of the invention, reference should be made to the following detailed description and the accompanying drawings, in which:

FIG. 1 is a side view of apparatus for assembling optical fiber terminations according to the invention and in which the optical fiber termination is shown partially unassembled and partially in section;

FIGS. 3, 4 and 5 are perspective views of three different compressive systems for the optical fiber termination of FIGS. 2A–2C;

FIG. 6 is a side view of termination assembly apparatus according to one practice of the invention in the open position;

FIG. 7 is a transverse cross-sectional view along line 7—7 of FIG. 6 with the termination omitted;

FIG. 8 is a transverse cross-sectional view along line 8—8 of FIG. 6 with the termination omitted;

FIG. 9 is a transverse cross-sectional view along line 9—9 of FIG. 6 with the termination omitted;

FIG. 10 is a side view of the termination assembly apparatus of FIG. 6 in the closed position;

DESCRIPTION OF THE ILLUSTRATED EMBODIMENTS

Figure 2A:
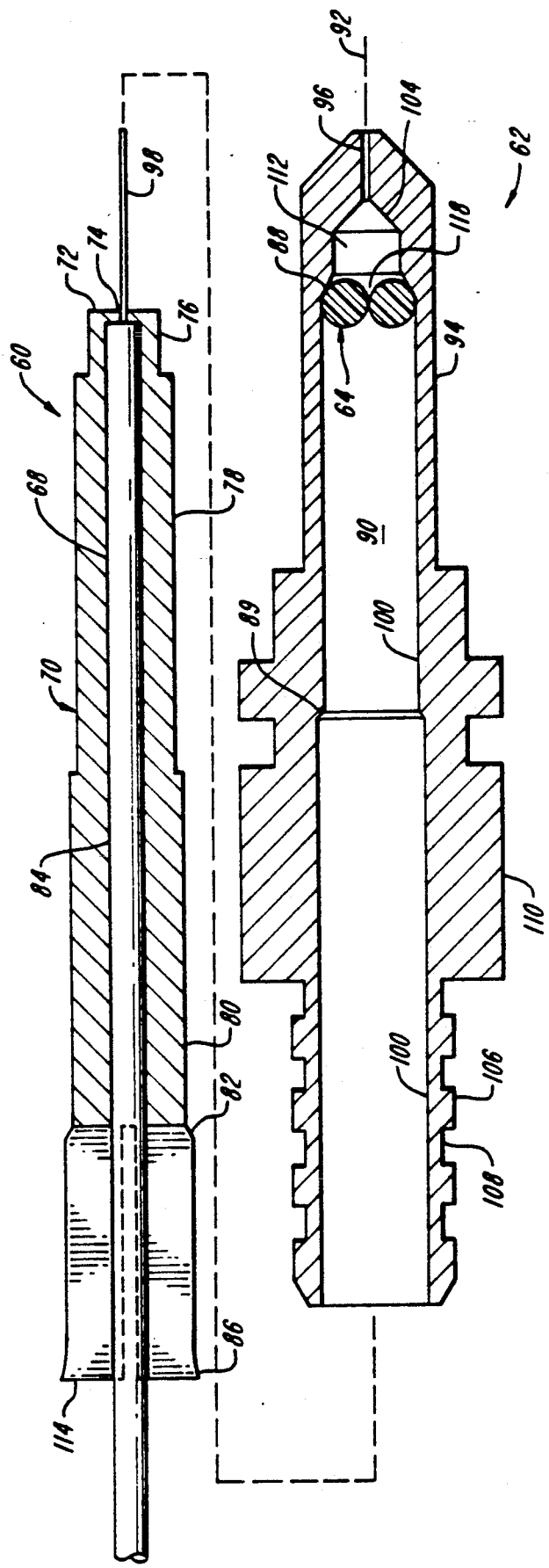
FIG. 2A is a sectional view of an optical fiber termination embodying features of the invention, prior to insertion of the actuating element of the termination into the terminating element of the termination.

A tool 10 for connector assembly according to the invention, shown in FIG. 1, has a holder element 14, a drive element 16, and a positioning element 18 for maintaining the holder element 14 and drive element 16 in selected disposition relative to a selected path. The tool 10 can be used to assemble a fiber optic termination 12.

The illustrated holder element 14 includes a jaw element support 20 integral with a jaw element 22. The jaw element support 20 can be dimensioned as known to mount the jaw element 22 on a given platform. The jaw element 22 includes a forward alignment element 24 having a guide slot 26, shown in FIG. 9, which receives the forward portion of a second workpiece 32. A cavity 28 replaceably and removably receives the termination 12 having a first workpiece 30 and, partially assembled with the first workpiece 30, a second workpiece 32. A compressive system 34 is typically disposed, in a manner described in detail below, between the first workpiece 30 and the second workpiece 32. A rearward alignment guide 38 defines a fiber exit slot 40, shown in FIG. 7, and provides a rear seating face 36 for the first workpiece 30.

With further reference to FIG. 1, the drive element 16 can be mounted on a drive element support 42. Support 42 can be of conventional dimension and configuration to adapt the drive element 16 to a given platform. Typically, the drive element 16 includes an aperture 44 which houses a resilient element (not shown) for producing the desired force characteristic. Continuous with the aperture 44 is an axially extending tubular passage 46 which receives an axially extending plunger element 48. The end of the passage 46 adjacent to the aperture can be flared or stepped to accommodate a outwardly extending flange 50 on the plunger element 48. The plunger element 48 communicates the force characteristic provided by the resilient element to the second workpiece 32. The plunger element 48 can include a jaw element 52 for removably and replaceably receiving the second workpiece 32.

The positioning element 18 can be any alignment system familiar to those skilled in the art. Exemplary positioning elements 18 include oppositely disposed guide rails. In this embodiment, one of either the holder element 14 or drive element 16 is held static and the other element is directed into contact therewith as directed by the guide rails. Alternatively, the positioning element 18 can be a pivot arranged to actuate the holder element 14 and drive element 16 along a common axis. Typical of the latter configuration are hand tools structured similar to, for example, pliers. Numerical control systems employing computer subsystems can also be employed to control the relative movement of the holder element 14 and drive element 16.

Figure 2B:
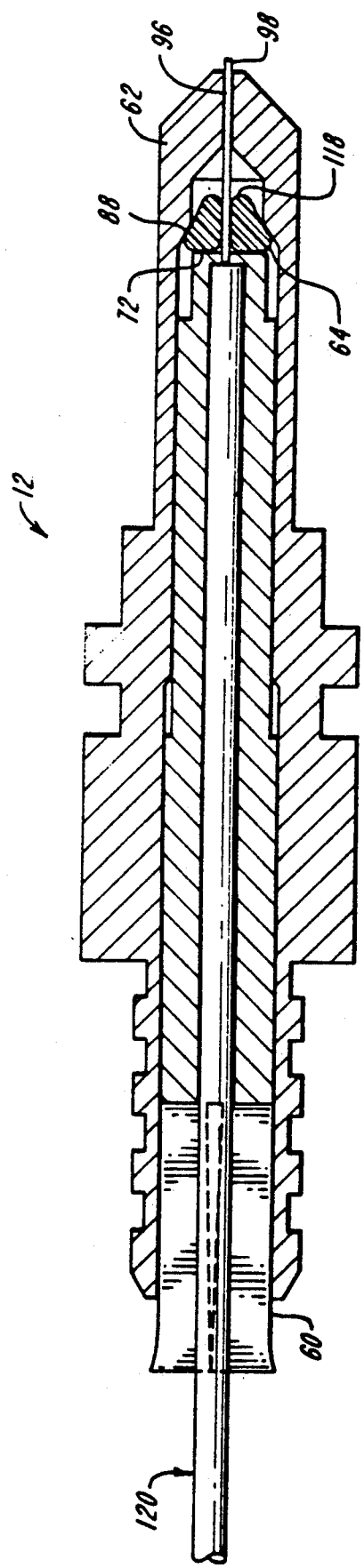
FIG. 2B is a view similar to FIG. 2A, with the actuating element partially assembled within the terminating element sufficiently to initially deform the compressive system.
Figure 2C:
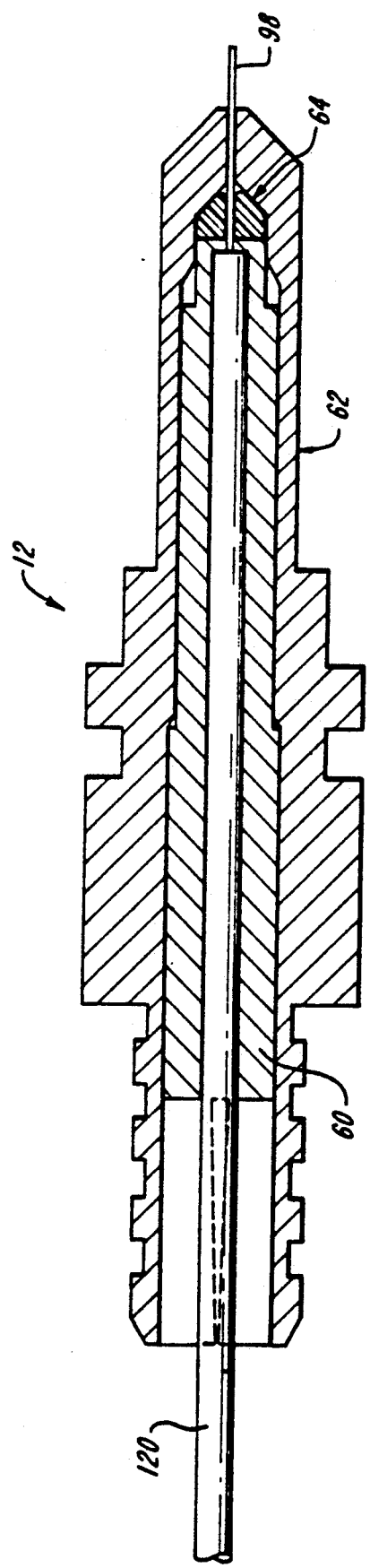
FIG. 2C is a view similar to FIGS. 2A and 2B of the termination fully assembled.

The fiber optic termination 12, shown in detail in FIGS. 2A, 2B, and 2C has an inner, actuating element 60, corresponding to the first workpiece 30, an outer, terminating element 62, corresponding to the second workpiece 32, and a compressive system 64 illustrated as having a set of three compressive elements 66. It is recognized, however, that the correspondence between elements 60 and 62 and workpieces 30 and 32, respectively, can be reversed.

The illustrated inner, actuating element 60 has an tubular axial through passage 68 concentrically within a outer surface 70, and has a compressively acting axially forward surface 72. The passage 68 is adapted to receive and support a buffered optical fiber cable 84. The illustrated passage 68 extends the full length of the actuating element 60 except for a cylindrical lip 74 projecting radially inward from the cylindrical bore at the exit end, i.e., at the end adjacent to the forward surface 72. The lip 74 provides a circular abutment that the fiber buffer abuts for positioning purposes when the fiber is fully assembled within the inner element 60.

The illustrated tubular outer surface 70 has a front section 76, a larger middle section 78, and a still larger back section 80. The section 80 has an enlarged outer diameter, axially rearward of the a step 82, illustrated as about three-quarters of the way back from the forward surface 72 to the back, i.e., the left end of the inner element 60. The section 80 also preferably includes a rearwardly located tapered flare 86. The tapered flare is preferably axially spaced forward from the back (left) end of the element 60 by a small fraction of the length of the back section 80. This location of the flare enables it to provide an axially secure anchorage with the outer element 62, in the fully assembled termination. FIGS. 2A-2C show this construction, in lieu of the back-most placement of the flare in FIG. 1.

In one illustrative termination, the radial step 82 is in the order of one to a few thousands of an inch and the radial flare 86 is slightly larger, i.e., in the order of five thousandths of an inch. Preferably, the radial steps between the sections 76 and 78, and further between the sections 78 and 80, are located in the fully assembled termination, shown in FIG. 2C, in close axial rearward proximity of a guide surface 88 and a step 89, respectively, of the outer element 62. Outer surface 70 can also include a locking ring groove (not shown), located rearward of the step between sections 78 and 80, that seats an expandable locking ring (not shown).

The illustrated termination 12, which engages a fiber optic cable with the compressive system 64 at the forward end of the termination, i.e. right-most in FIG. 2A, also engages the cable at its rearward end, i.e. left-most in FIG. 2A. This second engagement is provided by clamping members 114, at the rear end of the inner, actuating element 60. These clamping members are actuated by interferingly engaging the walls of passage 90. The illustrated clamping members 114 are formed from a portion of rearmost section 80 on the inner element 60 including flares 86. Axial slots through the tubular wall of the largest diameter section 80 of the inner element 60, as shown in FIGS. 2A, 2B, and 2C, form four clamping fingers 114 in the embodiment shown. The enlarged outer diameter of these fingers interferingly fits within the passage 90, to compress the fingers onto the buffered cable as the termination is assembled.

The illustrated outer element 62 is a tubular housing body that has an axial through passage 90 concentric about an axis 92 with a forward outer surface 94. The tubular passage 90 has a first section 96, illustrated as dimensioned for receiving and for supporting and positioning an unbuffered optical fiber 98. The first passage section is axially forward of a second passage section 100. This rear passage section 100 is dimensioned to telescopically receive and seat the inner element 60. A radial constriction forms a shoulder or abutment 104 at the back, rear end of the forward passage section 96 and forward of the passage section 100. The illustrated radial constriction is a right circular cone concentric with the axis 92 of the passage 90. The outer surface of the terminating element body is illustrated as having an axial succession of lands 106 and grooves 108 at the axial back end to receive and engage a cable-supporting sheath or sleeve, as conventional. The forward outer surface 94 is structured as a cylindrical plug to seat telescopically in conventional fashion in a mating receptacle termination (not shown), and the central portion 110 of the outer surface is structured to provide conventional mechanical connection with such a receptacle.

The illustrated second passage section 100 has, spaced apart in axial succession, a conical deflecting guide surface 88, an outward step 89, and, in some embodiments, a locking groove (not shown), all rearward of the radial constriction element 104. The illustrated passage 90 also has a short bore 112 between the elements 104 and 88. The guide surface 88 forms a funnel, preferably with a cone angle in the order of 60 degrees, and having a forward diameter less than the composite diameter of compressive system 64 prior to being compressed. If employed, the locking groove is positioned to receive and seat the locking ring carried on the inner element 60, when the termination 12 is completely assembled.

The compressive system 64 of the termination 12 can include a single, centrally apertured deformable element such as the spherical element 116' of FIG. 4 or as the disk element 116'' of FIG. 5. The termination 12 of FIGS. 2A through 2C employs a set of three spherical elements 116 arranged in a circle to define a fiber-receiving hole 118 between them. In other embodiments, the compressive system 64 can include three rod-like elements 116''' as shown in FIG. 3.

To ensure that each compressive element 116 maintains substantially uniform holding pressure on an optical fiber or cable, each is preferably constructed of a homogeneous and resiliently pliable, elastomeric material that retains the memory of its undeformed shape. Examples of such a material include nylon, delrin, polyethylene, polypropylene, rubber, and polyvinyl chloride. The initial shape of the elements 116 may be of various configurations per FIGS. 2A through 2C, 3, 4, and 5, and, preferably, has a circular cross-section, as shown. The set of three spherical elements 116 shown in FIGS. 2A-2C is preferred.

The fiber passage 118, passing through or among element(s) 116, receives an unbuffered optical fiber 98, as FIG. 2A shows. Prior to compression, the fiber passage 118 has a diameter sufficient to allow free movement of the optical fiber. The size and shape of the fiber passage 118 may be altered by varying the number, diameter, and/or shape of the elements 116. Further, the compressive system 64 preferably has a tapered opening to the passage 118 to guide insertion and passage of the optical fiber. A system 116 of three spheres provides such a fiber guide, as shown in FIGS. 2A. If a one-piece compressive system 116 as in FIGS. 4 or 5 is used, it is preferred that the ends of the fiber passage 118 therein be flared to guide the optical fiber as also shown.

FIGS. 2A through 2C illustrate, in sequence, the process whereby the termination 12 engages and supports the optical fiber 84. As shown in FIG. 2A, a buffered fiber optic cable 84 is seated within the passage 68 of the inner element 60, and the unbuffered and clad optical fiber 98 of the cable, extends beyond the compressively acting surface 72 of the inner element 60. The compressive system 64 is assembled with the cable 84, as by sliding it over the fiber 98 prior to assembly with the outer terminating element 62. An alternative step, shown in FIG. 2A, is to place the compressive system 64 within passage 90 of the outer, terminating element 62 at the forward end of the second passage section 100.

The inner element 60 is slidingly telescoped into outer the element 62, as shown in FIG. 2B, with the unbuffered optical fiber 98 passing through the clearance hole 118 and through the forward passage section 96 of outer element 62, to project axially beyond the termination element 12. After the termination elements 60 and 62 are partially assembled and aligned with each other and with the cable 84, further axial assembly of the inner element 60 with the outer element 62, includes compressing the compressive system 64 between the compressively acting surface 72 of inner element 60 and the guide surface 88 of the outer element 62. The guide surface 88 deflects the axial force exerted by compressively acting face 72 causing the compressive system 64 to deform radially inwardly and into initial mechanical engagement with the optical fiber 98.

Further assembly of the two termination elements, shown in FIG. 2C, presses the compressive system 64 axially into the bore 112 and against the abutment, 104, with continued compression radially inward onto the fiber 98. The inner and outer elements 60 and 62 thus function like a piston within a cylinder respectively, and compress the set of elements of the compressive system onto the fiber 98.

Concurrently, the greater diameter of inner element 60 rearward of step 82 produces a compressive engagement between section 80 of inner element 60 and the outer element 62, and deflects the clamping fingers 114 concentrically inward onto cable 120.

The inner element 60 telescopes into the outer element 62 until the rear face of clamping members 114 are substantially aligned with the rear edge of the outer element 62. In embodiments of the termination using a system of locking a groove and ring, the elements 60 and 62 are telescoped until the locking groove and ring are aligned, at which point the locking ring expands and engages the surfaces of the groove.

The assembled compressive system 64 mechanically engages the unbuffered optical fiber 98, for supporting and retaining the fiber 98 in a fixed position, both axially and radially. The passage 90 within the forward section 96 supportingly receives with minimal clearance the optical fiber tip that projects forward of the compressive system to align and position it with precision. Further, the compressively acting clamping fingers 114 secure the buffered clad optical cable 84 to the assembled termination elements 60 and 62.

The projecting optical fiber 98 is trimmed and polished, as known in the art, to complete the termination of the cable 84.

As also known in the art, a sleeve (not shown) may be positioned over the buffered optical cable 84, after final assembly of the termination 12, such that a portion extends over the lands 106 and grooves 108 of the outer terminating element 62 and over the jacket of the optical fiber cable 84. The sleeve may be crimped or otherwise secured in position.

It will be apparent that the assembly procedure requires axial telescoping of the elements 60 and 62 together, and requires no threading or rotating of one element relative to the other or relative to the optical fiber. The only force or stress to which the exposed fiber 98 is thus subjected is radial compression by the compressive system 64.

FIGS. 6 and 10 illustrate one embodiment of the assembly tool 10 in accordance with the invention and having a termination 12 disposed in a jaw element 22 of a holder element 14. The relative movements of the holder element 14 and the drive element 16 are controlled by the previously described positioning element 18.

The jaw element 22 includes the forward alignment guide 24, rear alignment guide 38, and the cavity 28 between them for receiving the first workpiece 30 and, partially assembled with the first workpiece 30, the second workpiece 32. The forward alignment guide 24 includes a guide slot 26. The guide slot 26, shown in detail in FIG. 9, has a generally oblong shape and an end opening onto the upper surface of the jaw element 22. The guide slot 26 is arranged to support the forward portion of the second workpiece 32.

The rearward alignment guide 38, shown in FIG. 7, provides a rear seating face 36 which receives the rearward face of the first workpiece 30. To ensure that the force characteristic produced by the drive element 16 concentrically and coaxially telescopes the workpieces without buckling of the termination 12, the rear seating face is arranged at an angle of about 90 degree relative to the workpieces axis 144. The rearward alignment guide 38 further includes a fiber exit slot 40 to accommodate the cable 84 extending from the assembled workpieces 30 and 32. The illustrated fiber exit slot 40 has an end opening onto an upper surface of the jaw element 22.

The drive element 16 of FIGS. 6 and 10 broadly includes a resilient element 150 for producing a selected force characteristic, e.g., a selected force to distance ratio, and a plunger element 48 for communicating the force characteristic to the workpieces.

In one embodiment of the invention, the resilient element 150 is a compression spring, in particular a disc spring. To use the tool 10 in conjunction with the illustrated termination 12, described in FIGS. 2A through 2C, the illustrated resilient element 150 produces a constant force characteristic of one hundred fifty pounds over a travel distance 0.030 inches. A single disc spring, or set of springs can be used. Those skilled in the art will recognize that by stacking disc springs in parallel, the force of the discs add; by stacking the discs in series the total travel distance of the discs add. One preferred disc spring has a ratio of no load height to disc thickness of between about 1.4 and about 1.6. In particular, one preferred disc spring has a ratio of 1.5 and dimensions of 18 millimeters O.D.×6.2 millimeters I.D.×0.4 millimeters Height. The force characteristic of the preferred disc at 75% and 100% deflection is 31 pounds; the total travel of the preferred disc from 75% to 100% deflection is 0.0059 inches.

The requisite force and travel distance for a termination can be determined empirically. The force produced is sufficient to assemble the termination 12 against a resistance force which is a function of the displacement of the first workpiece 30 relative to a second workpiece 32. A resilient element 150 having the preferred force characteristic over the requisite travel distance, for use in the present embodiment of the invention, can be prepared by: (1) stacking five of the preferred disc springs in parallel; (2) assembling five of the spring stacks in series, and; (3) compressing the unit to 60% of total deflection and placing it into the aperture of 44 of drive element 16. Pre-compression to 60% of total deflection enables the desired constant force characteristic to be achieved with minimal prior travel.

Although the illustrated resilient element 150 uses compression, or disc, springs, those skilled in the art will recognize that other electro-mechanical, pneumatic, or hydraulic systems capable of providing the requisite constant force characteristic can be substituted.

The plunger element 48, which communicates the force characteristic produced by the resilient element 150, typically includes a jaw element 52, which removably and replaceably engages the forward portion of the second workpiece 32, and a flange 50, to prevent excess forward axial movement of the plunger element 48 upon rebound of resilient element 150 at the end of an assembly sequence. The plunger element 48 is typically connected to a plate 152 which provides a seat for the above-described spring unit.

Figure 11:
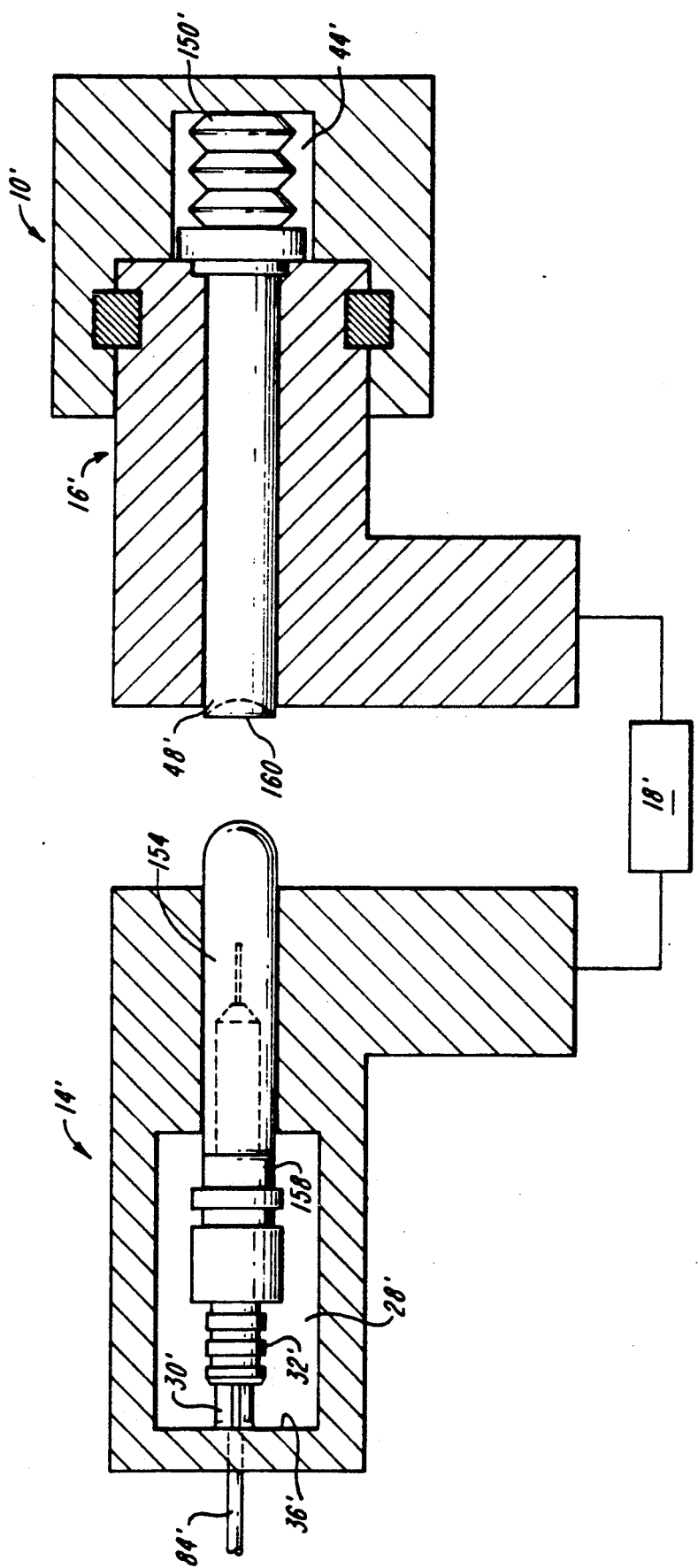
FIG. 11 is a side view of another termination assembly apparatus, in the open position, according to the invention.
Figure 12:
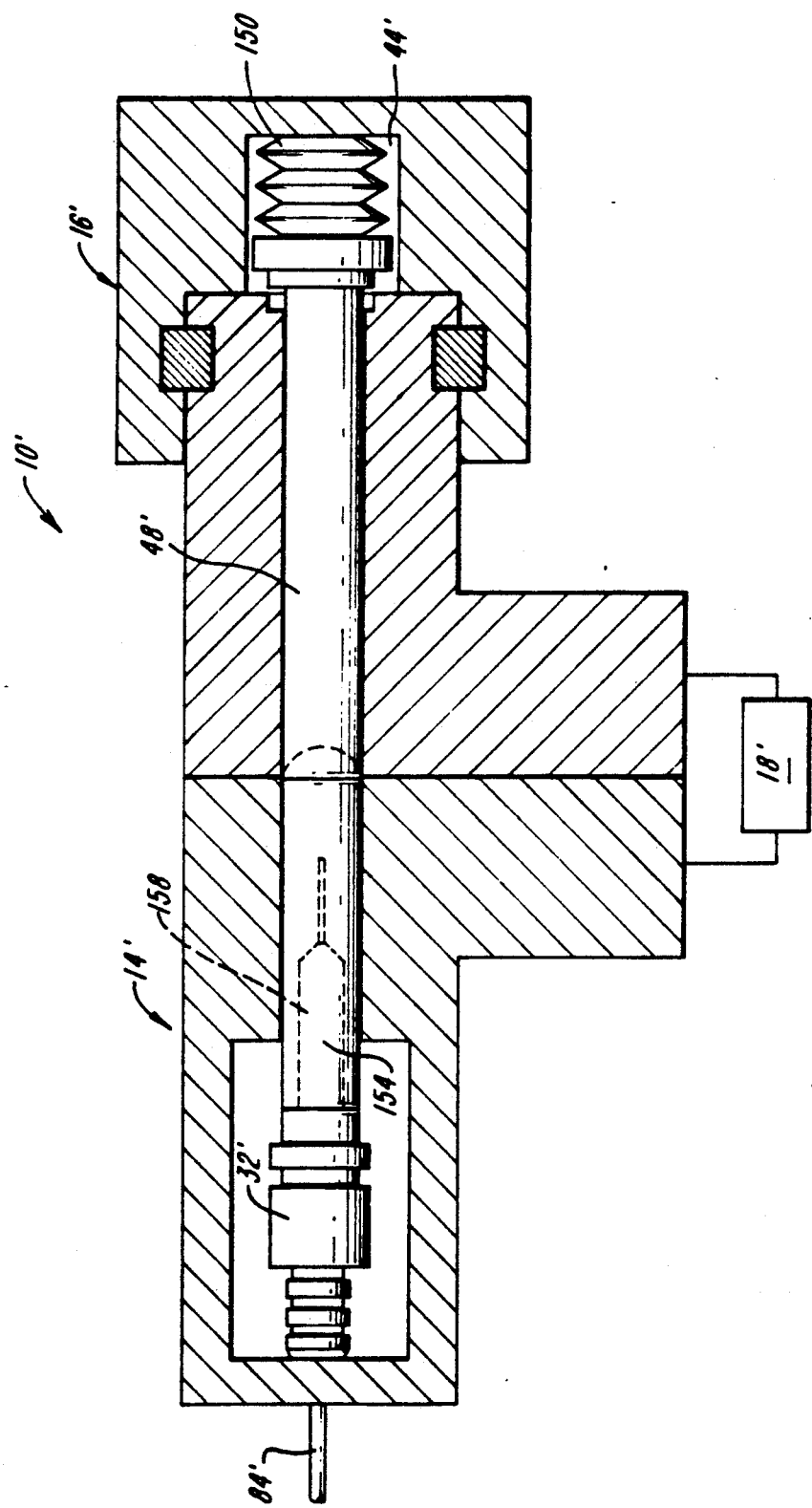
FIG. 12 is a side view of the termination assembly apparatus of FIG. 11, in the closed position.

FIGS. 11 and 12 show another tool 10' according to the invention for assembling terminations 12. In contrast to the tool 10 of FIGS. 6 and 10, the plunger element 48' of the tool 10' does not engage the second workpiece 32' directly and the elements 14' and 16' of the tool 10' are configured to pivot about a common axis. Further, the embodiment of FIGS. 11 and 12 does not include a forward alignment element. An intermediate plunger element 154 is compressively engaged between an external shoulder on the first workpiece 32' and the plunger 48', and thereby communicates the force characteristic produced by resilient element 150' to the workpiece 32'. To permit the elements 14' and 16' to be pivotable about an axis, a first end of the intermediate plunger element 154 preferably has a hemispherical shape. The hemispherical shape permits continuous engagement between the surface 160 of the plunger element 48' and the intermediate plunger element 154. A second end of the intermediate plunger element 154 includes a jaw element 158 that permits the intermediate plunger element 154 to engage the second workpiece 32'. Further, the holder element 14' supportingly holds the partially assembled termination workpieces 30' and 32' with a frame that forms a wall or abutment 156a through which the optical cable 84' extends and against which the back end of the inner first workpiece 30' is compressively seated. The illustrated frame encircles the cavity 28', and replaceably seats the front of the second workpiece 32' within a bore in which the intermediate plunger 154 is slidingly seated. The remaining structure and its function for this embodiment of the invention can be in accord with the preceding description of FIGS. 6 and 10.

Figure 13:
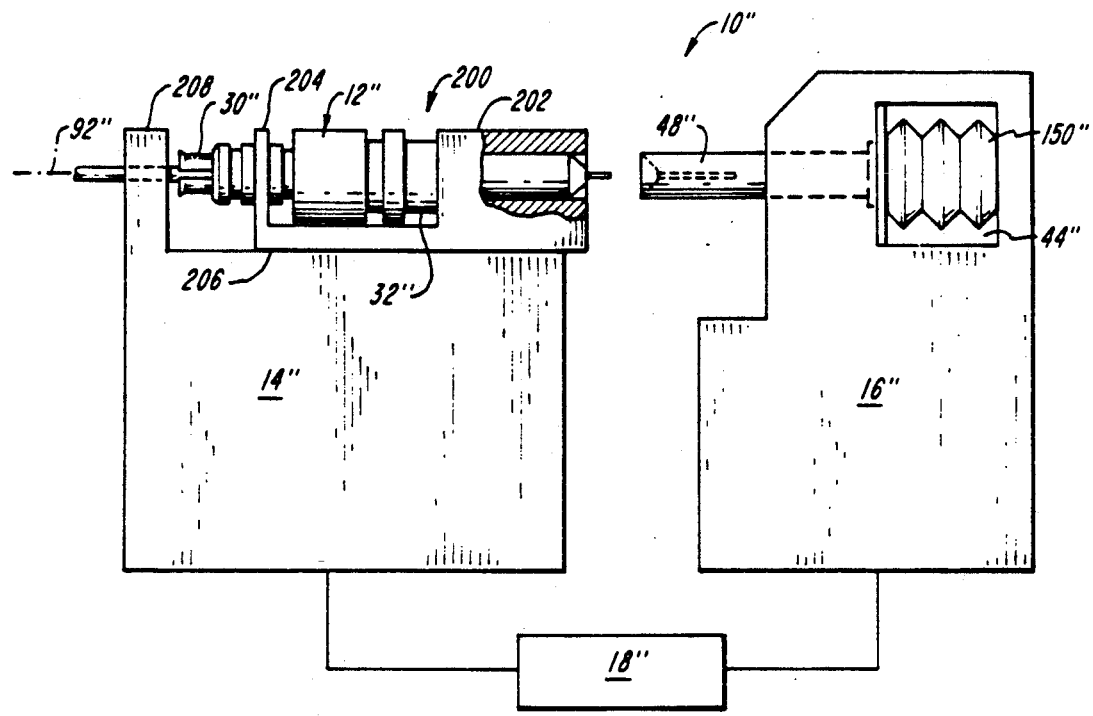
FIG. 13 is a side view of another embodiment of termination assembly apparatus according to the invention in the open position.
Figure 14:
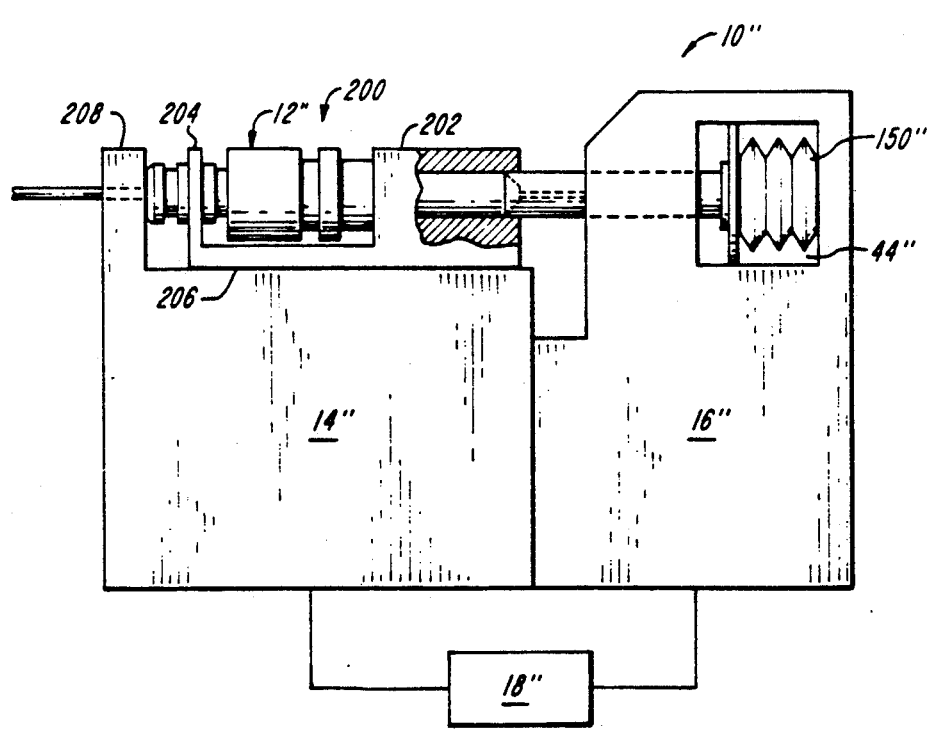
FIG. 14 is a side view of the termination assembly apparatus of FIG. 13 in the closed position.

FIGS. 13 and 14 illustrate another embodiment of the tool 10" in which the holder element 14" mounts a sliding support 200 configured to receive and support the termination 12. The support 200 is slideable on the holder element along the termination axis 92". The support includes a forward alignment element 202, a rearward second workpiece support 204, and a base 206. A rear alignment guide 208 continues to provide a rear seating face which receives the rear face of the first workpiece 30". The remaining structure and its function for this embodiment of the invention can be in accord with the preceding description.

FIGS. 6 and 10, and 11 and 12, illustrate one process according to the invention, as practiced using the above-described embodiments of the apparatus of the invention, with a termination 12 including a first workpiece 30 and a second workpiece 32. As shown in FIGS. 6 and 11, a first workpiece 30, assembled with a second workpiece 32, is removably and replaceably held in the holder element 14. The relative positions of the first and second workpieces 30, 32 is similar to that shown and described in connection with FIG. 2A. To telescope the workpieces, the first workpiece 30 and second workpiece 32 are selectively aligned and positioned along a path which is coaxial with a longitudinal axis of the plunger element 48.

In the next step, the jaw elements 52 and 158, of the plunger element 48 and the intermediate plunger element 154, respectively, engage the second workpiece 32. Initial contact between the second workpiece 32 and the jaw elements 52 and 158 also pushes the first workpiece into abutting contact with the rearward seating face 36. After this initial contact, the termination 12 is substantially in the condition shown in FIG. 2B.

Displacement of the second workpiece 23 relative to the first workpiece 30 over a selected distance continues using the constant force provided by the resilient element 150. The application of the selected constant force continues until the termination is completely assembled in the manner shown and described in connection FIG. 2C.

Post-assembly processing of the termination 122 includes clipping and polishing the fiber. A typical post-assembly processing method is disclosed in OPTICAL CABLE TERMINATION PROCEDURES published by the assignee of the present invention and incorporated herein by reference. As described therein, the fiber is clipped by scribing the exposed projecting fiber and pulling the fiber along its axis to sever it. The forward end of the termination element, with the clipped fiber extending therefrom, typically is then inserted into a polishing tool and passed over an abrasive film, e.g., one formed of aluminum oxide, to polish the fiber facet. As also known in the art, the end of the termination element, and hence the fiber facet, can be made optically flat, or given a selective radius, by selection of the proper polishing tool.

The foregoing practice of the invention attains the force characteristic for assembling a mechanically-engaging fiber optic termination as in FIGS. 2A–2C by applying a compression force that is constant, in that it has a selected maximum value. This force telescopically slides the inner and outer pieces of the termination together until the compressive system 64 of the termination has been deformed as desired to engage the optical fiber to the desired degree, and not beyond. The force also engages the two pieces of the termination sufficiently to press the clamping fingers 114 onto the buffered cable, at the back end of the termination.

FIGS. 15–19 illustrate another practice of the invention that attains this result with a force characteristic that increases to a selected maximum value and then releases to a significantly lesser value. The maximum force value is adjustable, as desired to attain optimum fiber optic terminations and to operate with different fiber optic cables and different terminations.

Figure 15:
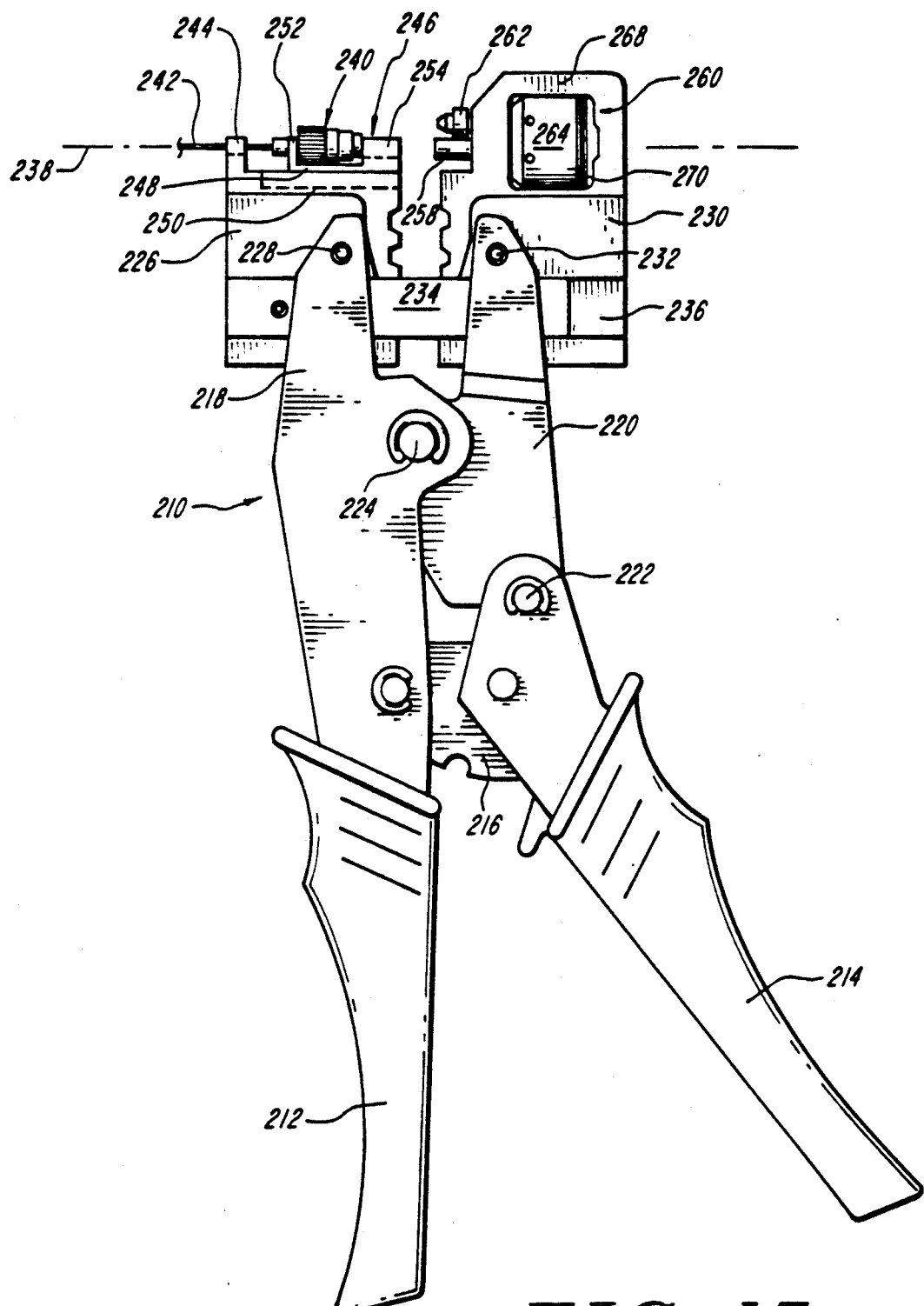
FIG. 15 is a plan view of a tool for assembling a fiber optic termination with a selected force, according to further features of the invention.

A hand tool 210 as shown in FIG. 15 for this practice of the invention has a known-compound pliers-like clamp structure with two handles 212 and 214 hingedly joined together by a link 216. An arm 218 extends rigidly from the handle 212. A second arm 220 extends with a hinge connection 222 from the other handle 214, and has a hinge-connection 224 with the arm 218.

A holder element 226 is mounted by a hinge connection 228 on the end of one arm, illustrated as the rigid arm 218. The drive element 230 of the tool 210 is mounted by a hinge connection 232 on the end of the other arm 220. Each clamp arm 218 and 220 preferably is bifurcated at its end and receives the holder element 226 and drive element 230, respectively, between the bifurcations.

With further reference to FIG. 15, a slide bar 234 is secured at one end to the holder element and slideably seats in a slot-like track 236 formed on the drive element 230. The bar and track are straight, and extend parallel to the axis 238 along which the tool assembles a termination 240.

With this structure, moving the handles 212 and 214 together moves the holder and drive elements 226 and 230 together, with a mechanical advantage. The sliding of the bar 234 along the track 236 during this movement maintains the holder element and drive element opposite one another as shown, in the same angular orientation relative to one another. Where desired, the tool 210 can incorporate one or more springs (not shown) as conventional, to bias the tool open. Likewise, the tool can have a ratchet mechanism or other accessory known in hand tools of this type.

The upper side of the tool holder element 226, distal from the handle 212, has an upstanding stop 244 at the end distal from the drive element 230, i.e., at left side in FIG. 15. The stop 244 is slotted—similar to the slot 40 of the rear guide 38 shown in FIG. 7—to freely receive a fiber optic cable 242 extending from the termination 240 being assembled.

The holder element slideably mounts a cradle 246 aligned with the stop along the axis 238. The cradle has a base 248 slideably seated in a slide track 250 in the upper side of the holder element, for movement along the axis 238. The cradle also has a pair of upstanding termination seats 252 and 254. The seats are fixedly spaced apart and each is recessed, along the direction of axis 238, to receive and support a termination outer element, such as the termination element 62 described above with reference to FIGS. 2A–C. In the specific example shown, the forward seat 254 supportingly receives the forward outer surface 94 (FIG. 2A) of the termination element 62. The rearward seat 252 supportingly engages this termination element 62 just behind the central portion 110 of the outer surface.

A termination 240 to be assembled is fitted in the cradle seats 252 and 254 when the cradle is slideably positioned forward, distal from the stop 244. During the subsequent operation of the tool, the cradle slides backward to abut the backward end of the inner termination element 60 against the stop 244. The tool 210 holder element 226, with the cradle 246 and stop 244, thus can be identical to the holder element 14" of the FIG. 13 tool 10", which has a sliding support 200 and a rear guide 208.

FIG. 15 further shows that the drive element 230 of the tool 210 projects a rod-like ram 258 along the axis 238. A central clearance bore 258a recesses the drive face of the ram. The ram is positioned on the drive element to fit the bore freely, when the tool is closed to move the drive element 230 toward the holder element, over the optical fiber tip projecting from a termination that is seated on the holder cradle 246. Thus, when the tool 210 is closed, the illustrated ram drive face abutting engages the cradle forward seat. Further closure movement continues to move the ram along the axis 238 to slide the cradle backward, to abut the termination inner element against the stop 244, and to press the cradle forward seat against the termination outer element for telescoping it fully with the inner element.

A force-release mechanism 260 on the drive element 230 couples the movement of the drive element to the ram, as described above upon closure of the tool. The release mechanism couples to the ram the tool-closing force developed in response to squeezing the handles. However, when a selected level of force develops, the release mechanism decouples the ram from the drive element. At that juncture, the force on the ram drops essentially to zero, and the ram applies essentially no force to the termination seated in the holder element.

The resultant force characteristic which the tool 210 thus develops, and applies to a termination, presses the termination elements together with a desired maximum force that secures the mechanical engagement of the optical fiber. The release of the force at the selected level prevents over-compression of the termination, and thereby assures that the compressive system of the termination does not damage the optical fiber.

The force level at which the illustrated release mechanism 260 trips, and decouples the ram, is adjustable by way of a threaded element 262 accessible on the drive element 230 of the tool.

The illustrated release mechanism is of a type that develops the selected maximal force at which release occurs by developing a selected spring compression. The mechanism thus employs a spring structure that produces a force having a consistent, repeatable relation to the amount of spring deflection.

Figure 16:
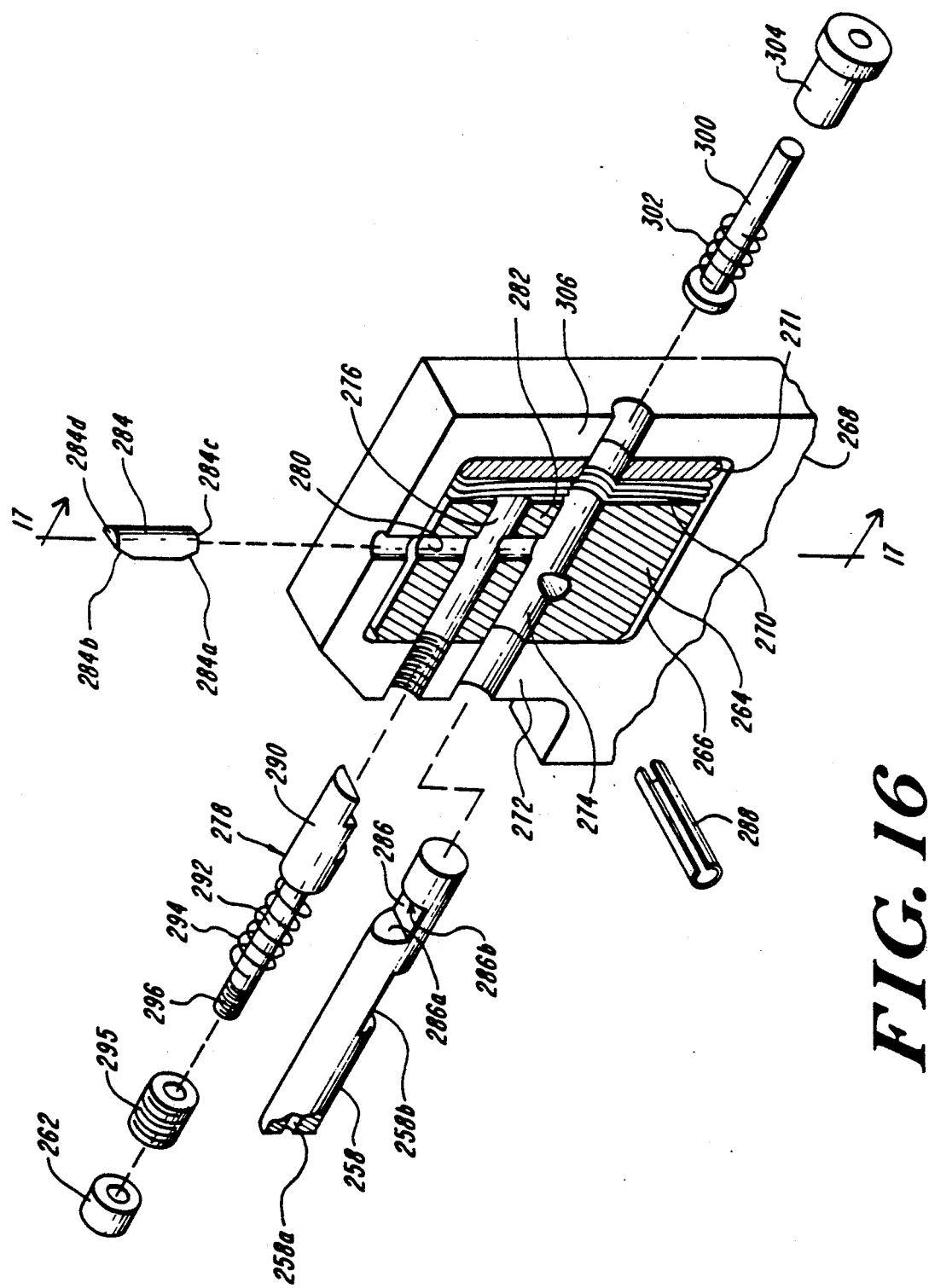
FIG. 16 is an exploded view of a release mechanism for the tool of FIG. 15.

More particularly, with reference to FIGS. 15 and 16, the mechanism 260 employs a thrust body 264 seated in an open cavity 266 in the frame 268 of the drive element. A compression spring system 270, illustrated as formed by a series of disc springs, is seated in the cavity under partial compression between a pressure plate 271, in abutment with the frame, and the back end of the thrust body.

The illustrated thrust body is cylindrical and in abutment with the spring system 270 at an axial back end and with the axial front end thereby normally pressed axially forward, against a frame front cross-member 272 by the spring pre-compression force.

Figure 17:
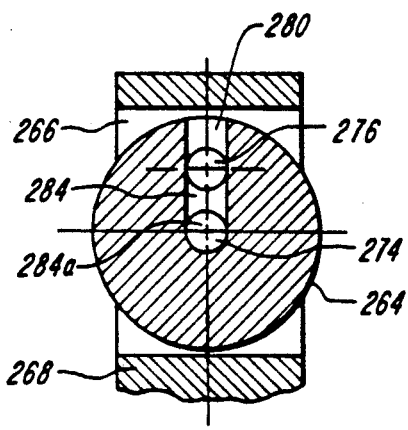
FIG. 17 is a cross-sectional view of the assembled release mechanism of FIG. 16, along line 17—17.

As shown in FIGS. 16 and 17, the thrust body has a central, axial thru passage 274 in which the ram 258 slideably seats. A second thru passage 276 in the thrust body, parallel to the ram passage 274, slideably seats an adjustment pin 276. A transverse passage 280 extends in the thrust body along the diameter that interacts both axially-oriented passages 274 and 276. The transverse passage extends only from the outer surface of the thrust body across the adjustment passage 276 and through the web 282 between the axially-oriented passages. This passage slideably seats a pawl 284.

The illustrated ram 258 is a cylindrical rod having the fiber-receiving clearance bore 258a extending axially for a short distance at its forward end, and having a notch 286 closely axially spaced from its back end. The notch 286 has a bevelled or diagonally extending cam surface 286a at its axial front end and has a radially extending stop surface 286b at its axial back end. Between these surfaces, the void formed by the notch can receive one end of the pawl 284.

The cylindrical surface of the rod 258 is also relieved with a shallow cross slot 258b. A retaining pin 288 secured in the thrust body extends across the slot 258b to limit the axial movement of the ram 258 relative to the thrust body.

The ram length extends from the back end of the thrust body through the frame cross-member and beyond the drive element 230 sufficiently to engage the cradle carried on the holder element.

The illustrated adjustment pin 278 has, in axial succession, a semi-cylindrical pawl-engaging section 290, a stem section 292 of lesser diameter and around which a coil spring 294 fits, and a threaded end mounting section 296. The end mounting section is slideable within a collar 295, against which the spring 294 presses. The collar mounts, as by external screw threads, to the frame 268 of the drive element 230. A nut or other threaded adjustment element 262 threads onto the end mounting section 296.

The pawl-engaging section 290 of the adjusting pin is cut-away or relieved to form a notch 290a having a radially-extending semi-circular stop wall 290b at the axial front end. The back end of the notch 290a is open, due to a further cut-away of the section 290 to form an axial tab 290c.

The illustrated pawl 284 has a relatively short right cylindrical shape, with diagonal cam surfaces 284a and 284b extending across approximately half the diameter at each end. The two cam surfaces are complementary, in that they are inclined toward one another, and are on the same diametrical side of each end. The pawl is thus symmetrical end-for-end, i.e., about the axial middle.

The cam surfaces 284a and 284b on the pawl, and the cam surface 286a on the ram notch, are each preferably oriented at forty-five degrees relative to the cylinder axis of each member.

Figure 18:
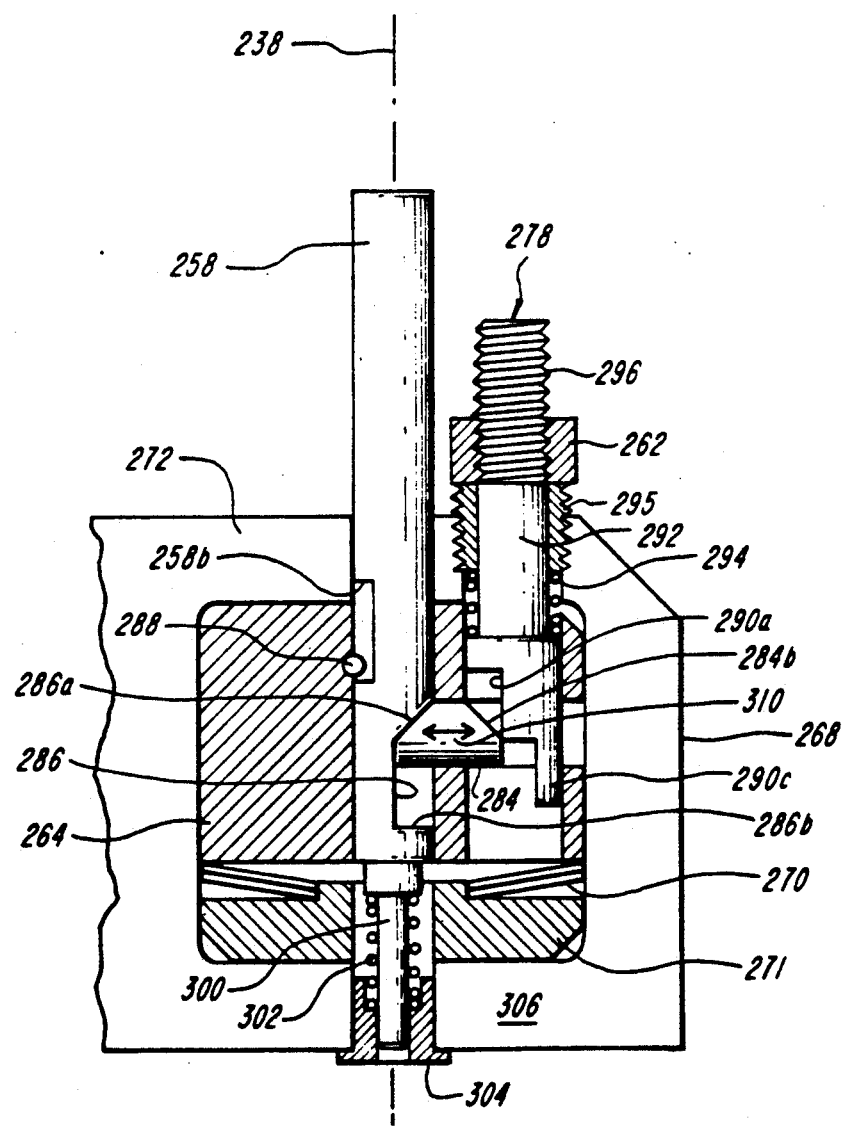
FIG. 18 and 19 are fragmentary views, partly in section, of the tool of FIG. 15, showing the release mechanism in pre-release and post release conditions, respectively.

With reference to FIGS. 16, 17, and 18, the assembled release mechanism 260 has the ram 258 slideably seated in the passage 274 of the thrust body 264 and secured with the pin 288 that slideably engages the cross-slot 258b. The thrust body 264 is seated in the open cavity 266 of the frame 268, compressed by the spring system 270, as shown in FIG. 15, and the ram 258 extends through a passage in the frame cross-member 272 to extend along the axis 238. The ram 258 is rotated to dispose the notch 286 facing toward the transverse passage 280.

The ram 258 is resiliently biased axially forward, normally to the position shown in FIG. 18, by a push rod 300 having an end disk abutting the back end of the ram and an axial stem. A coil spring 302 is seated around the stem and compressed between the end disk and a plug 304 that is secured to a back cross-member 306 of the frame 268. The plug has a collar in which the spring 302 seats, and has an axial central bore through an end wall and within which the stem of the push rod 300 can axially slide. The plug 304 bore, the coil spring 302 and the push rod 300 stem are each aligned along the axis 238.

With this structure, the compressed spring 302 biases the push rod 300, which thereby biases the ram 258, axially forward relative to the frame 268.

The pawl 284 is slideably seated in the transverse passage, and rotated so that the cam surfaces 284a and 284b face forward, i.e., upward in FIG. 18. The pawl is positioned axially to project into each passage 274 and 276, with one cam surface in the ram passage 274 and facing and normally in abutment with the cam surface 286a of the ram notch 286. The other cam surface is in the adjustment passage 276 with the radial end face 284d facing and normally in abutment with the flat surface of the notch 290a of the adjustment pin.

The adjustment pin is slideably seated in the passage 276 of the thrust body and extends, parallel to the ram 258, through a passage in the frame front cross-member 272. The adjustment pin is rotated with the flat surfaces of the notch 290a and of the tab 290c facing the pawl.

The adjustment pin 278 is resiliently biased axially backward relative to the frame 268 by the compressed coil spring 294. This spring extends around the pin stem section 292 and is compressed between the collar 295 that is fixed to the frame front cross-member 272 and an annular shoulder on the pin. This shoulder is formed by the diameter increase between the stem section 292 and the pawl-engaging section 290. The axial location of the pawl-engaging section 290 of the pin 278, within the thrust body, can be adjusted by threading the nut 262 relative to the threaded mounting section 296 of the pin. As discussed further below, this displacement adjustment selects the force level at which the release mechanism trips, or releases.

The release mechanism 260 operates with the pawl 284 normally fixed in place, as in FIG. 18, to lock the ram 258 to move axially with the thrust body 264. When the axial force applied to the ram 258—by way of the thrust body 264 coupled to the spring system 270 coupled to the drive element frame 268—is sufficient to deflect the spring system by a selected displacement, the pawl 284 disengages from the ram, and shifts to the release position shown in FIG. 19. The pawl thereby releases the ram from axial movement with thrust body, and the force which the drive element applies to the ram drops to a nil value during a selected closure travel of the tool.

The tool 210 thus regulates the force applied to a fiber optic connector by regulating the distance the spring system 270 is compressed. A spring is typically rated by a spring constant specified in pounds of force per inch of compression. The spring constant can be constant as in the case of coil springs or non-linear as in the case of most disc springs. The tool of this invention can operate with linear or non-linear springs, so long as when the spring is compressed (x) distance, it consistently produces (y) pounds of force. Most high quality disc springs do this.

Operation of the tool 210 depends upon movement of the thrust body 264 and ram 258 as one unit compressing the spring system 270. Load is applied to the ram and transferred to the thrust body via the pawl 284. The pawl and ram contact surfaces are both angled at forty five degrees to their diametrical central axes. This angle causes the force on the pawl to be split into two components, with one component being in the same direction as the force on the ram and the other component in a direction perpendicular to the force being applied to the ram. This force gives the pawl the tendency to move away from the ram. As the thrust body moves it compresses the spring system.

The pawl 284 is prevented from moving by the adjusting pin 278. The adjusting pin does not move with the thrust body during the application of load to the ram. The adjusting pin can be moved relative to the thrust body via the adjusting nut 262. When the tool is in the unloaded state, the flat end surface of the pawl is against the flat surface in the notch 290a of the adjusting pin. When load is applied to the ram, the ram and the pawl and the thrust body move axially relative to the adjusting pin. When the flat end surface 284d of the pawl passes the back end of the notch 290a of the adjusting pin, the pawl is free to move laterally, consequently unloading the ram and the spring system. Controlling when the pawl is released, relative to the thrust body displacement, controls the maximum force that can be applied to the ram prior to release. The adjusting pin of the illustrated tool 210, in one instance, can be set so that the ram releases pressure at selected value at least between 125 and 135 pounds of force.

More particularly, in the normal, force-applying condition of FIG. 18, the notch 290a of the adjustment pin 278 engages the pawl end face 284d. This engagement restrains the pawl, in its passage 276, shifted to the left along arrow 310, where the pawl cam surface 284a abuts the cam surface 286a on the ram. This engagement fixes or locks the ram to move axially with the thrust body 264.

As the spring system 270 compresses under load, further from its initial condition shown in FIG. 18, the thrust body 264 displaces axially backward in the open cavity 266. The thrust body 264 thus displaces axially backward relative to the adjustment pin 278, which is attached to the frame 268. Hence this displacement slides the pawl rearward relative to the adjustment pin 278. However, the pawl end face 284d continues to abut the notch 290a of the pawl-engaging section 290 on the pin 278, and the pawl remains in the ram-engaged condition of FIG. 18.

With further compression of the spring system 270, the pawl end face 284d moves rearward of the notch 290a. The pawl then shifts right (FIGS. 18 and 19), along arrow 310, as the pawl cam surface 284b slides relative to the back edge of the notch 290a on the pin. During this gradual shift movement of the pawl, the pawl cam surface 284a continues to abut the ram cam surface 286a.

Figure 19:
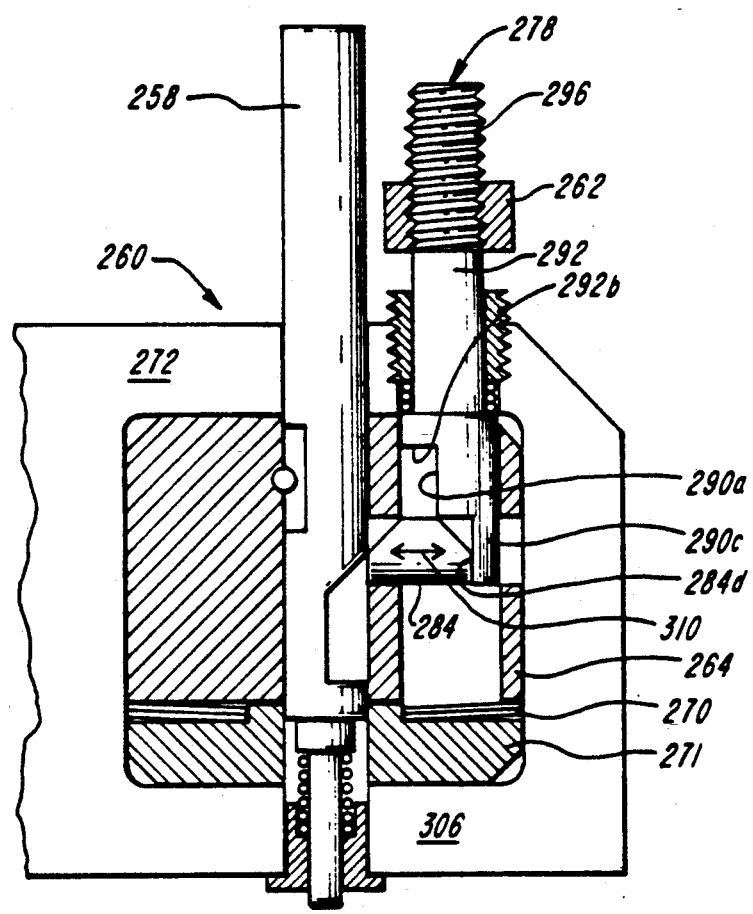

However, upon compression of the spring system 270 by a selected axial displacement of the thrust body, the pawl 284 is rearward, along the axis 238, of the notch 290a on the adjustment pin and shifts further along arrow 310 out of the ram passage, i.e., to the right in FIG. 18 and 19, to disengage from the ram 258. The pawl is then in the release position shown in FIG. 19.

The tool 210 automatically returns to the normal condition of FIG. 18 when the load is released, by the action of the ram-biasing spring 302 and the spring 294 that biases the adjusting pin. The spring 302 biases the ram axially forward relative to the thrust body 264, where it does not block the left-wise movement of the pawl along the arrow 310, to the position shown in FIG. 18. The spring 294 urges the adjusting pin 278 axially rearward, and engagement of the Pin section 290 with the pawl cam surface 284b shifts the pawl to the left, i.e., to the normal, force-applying condition of FIG. 18.

It will thus be seen that the invention efficiently attains the objects set forth above. In particular, the invention provides an apparatus and method for the assembly of optical fiber cable terminations that provide mechanical forces and hence do not require adhesive. This apparatus and the method of the invention can provide a selected force characteristic capable of mechanically secured terminations to optical fibers, without damaging the light transmissive path. The force characteristic has a maximal value. In one practice of the invention, the force remains substantially at or below this maximal value, i.e., has a constant maximal value. In another practice of the invention, the force drops to a significantly lesser value, i.e., releases, automatically upon attaining the desired maximal value.

It will be understood that changes may be made in the above constructions and in the foregoing steps and sequences of operation without departing from the scope of the invention. It is accordingly intended that all matter contained in the above description or shown in the accompanying drawings be interpreted as illustrative rather than in a limiting sense.

Having described the invention, what is claimed as new and secured by Letters Patent is:

1. Apparatus for assembling a fiber optic termination having first and second workpieces that interfit, said apparatus comprising A. holder means for removeably and replaceably holding the first workpiece in a selected position along a path, the first workpiece having a central bore in which an optical fiber is supportingly seated extending along said path and the first workpiece being arranged mechanically to hold the optical fiber securely upon selected telescopic assembly with the second workpiece, said holder means holding the first workpiece oriented to telescopically engage with the second workpiece, B. drive means for removeably and replaceably engaging the second workpiece that is partially telescopically assembled with the first workpiece held in said holder means, and for displacing the partially telescopically assembled second workpiece along said path relative to the first workpiece held in said holder means for further telescopical interfitting assembly of the two workpieces, for thereby securely holding the optical fiber in the first workpiece central bore, said drive means including a drive element arranged for providing a force of selected maximal value for said relative displacement of the workpieces, and C. means for maintaining said holder means and said drive means in selected disposition relative to said path during said engagement for providing said relative displacement of the work pieces.

2. Apparatus according to claim 1 wherein said drive means includes means for displacing the partially telescopically assembled second workpiece relative to the first workpiece held by said holder means with a force that has a selected substantially constant upper value over said telescopic displacement.

3. Apparatus according to claim 1 wherein said drive means includes means for displacing the partially telescopically assembled second workpiece relative to the first workpiece held by said holder means with a force that attains a selected maximal value and automatically thereupon releases to a substantially lesser value.

4. Apparatus according to claim 1 wherein said drive means includes force-release means for releasing said force from a selected maximal value to a substantially lesser value.

5. Apparatus according to claim 4 wherein

A. said drive means includes resiliently-acting means for producing said force with displacement consistently corresponding the value of the force, and B. said force-release means includes means responsive to a selected displacement of said resilient-acting means for releasing said force.

6. Apparatus according to claim 4 wherein said force-release means includes pawl means having a force-applying condition and a force-release condition, and arranged for transferring from the force-applying condition to the force-release condition with a pawl-moving action.

7. Apparatus according to claim 1 wherein the fiber optic termination has a compressive element seated with the first and second workpieces and disposed circumferentially about the optical fiber seated along said path, and wherein the workpieces compress the compressive element into secure engagement with the optical fiber upon full telescopic assembly, and wherein said drive element has force-limiting means for producing said force with a maximal value that applies only a limited compression on the compressive element.

8. Apparatus according to claim 7 wherein said force-limiting means produces said force with a substantially constant maximal value.

9. Apparatus according to claim 7 wherein said force-limiting means releases said force to a substantially lesser value upon attaining said selected maximal value.

10. Apparatus according to claim 1 substantially as shown and described.

11. A method for assembling a fiber optic termination having first and second workpieces that interfit, said method comprising the steps of A. removeably and replaceably holding the first workpiece by holder means in a selected position along a path, the first workpiece having a central bore in which an optical fiber is supportingly seated extending along said path and the first workpiece being arranged mechanically to hold the optical fiber securely upon selected telescopic assembly with the second workpiece, said holder means holding the first workpiece oriented to telescopically engage with the second workpiece, B. removeably and replaceably engaging the second workpiece that is partially telescopically assembled with the first workpiece held in said holder means by drive means, and thereby displacing the partially telescopically assembled second workpiece along said path relative to the first workpiece held in said holder means for further telescopical interfitting assembly of the two workpieces, for thereby securely holding the optical fiber in the first workpiece central bore, C. providing a force of selected maximal value for said relative displacement of the workpieces, and D. maintaining said holder means and said drive means in selected disposition relative to said path during said engagement for providing said relative displacement of the work pieces.

12. A method according to claim 11 wherein the fiber optic termination has a compressive element seated with the first and second workpieces and disposed circumferentially about the optical fiber seated along said path, and wherein the workpieces compress the compressive element into secure engagement with the optical fiber upon full telescopic assembly, and wherein said engaging and force-providing steps include a force-limiting step for producing said force with a maximal value that applies only a limited compression on the compressive element.

13. A method according to claim 12 wherein said force-limiting step produces said force with a substantially constant maximal value.

14. A method according to claim 12 wherein said force-limiting step releases said force to a substantially lesser value upon attaining said selected maximal value.

* * * * *